(12) United States Patent
Kataoka (10) Patent No.: US 8,218,114 B2
(45) Date of Patent: Jul. 10, 2012

(54) LIQUID CRYSTAL DISPLAY AND METHOD OF MANUFACTURING THE SAME

(75) Inventor: Shingo Kataoka, Machida (JP)

(73) Assignee: Sharp Kabushiki Kaisha, Osaka (JP)

( * ) Notice: Subject to any disclaimer, the term of this patent is extended or adjusted under 35 U.S.C. 154(b) by 546 days.

(21) Appl. No.: 11/280,982

(22) Filed: Nov. 16, 2005
(Under 37 CFR 1.47)

(65) Prior Publication Data

US 2006/0209240 A1    Sep. 21, 2006

(30) Foreign Application Priority Data

Nov. 22, 2004   (JP) ................................ 2004-337916

(51) Int. Cl.
    *G02F 1/141* (2006.01)
(52) U.S. Cl. ......... 349/135; 349/123; 349/114; 349/127
(58) Field of Classification Search .................. None
    See application file for complete search history.

(56) References Cited

U.S. PATENT DOCUMENTS

| | | | | |
|---|---|---|---|---|
| 4,548,891 A | * | 10/1985 | Riediker et al. | 430/283.1 |
| 5,216,531 A | * | 6/1993 | Hirai et al. | 349/93 |
| 6,015,507 A | * | 1/2000 | Kobayashi et al. | 252/299.01 |
| 6,074,708 A | * | 6/2000 | Onishi et al. | 428/1.1 |
| 6,108,064 A | * | 8/2000 | Minoura et al. | 349/130 |
| 6,985,200 B2 | | 1/2006 | Miyachi et al. | |
| 7,429,412 B2 | * | 9/2008 | Nam et al. | 428/1.2 |
| 2002/0001058 A1 | * | 1/2002 | Wang | 349/129 |
| 2002/0034709 A1 | * | 3/2002 | Fukuda et al. | 430/320 |
| 2003/0118922 A1 | * | 6/2003 | Hayashi et al. | 430/7 |
| 2004/0099841 A1 | * | 5/2004 | Kato et al. | 252/299.01 |
| 2004/0191428 A1 | | 9/2004 | Tsuda et al. | |
| 2005/0109985 A1 | | 5/2005 | Kataoka et al. | |

FOREIGN PATENT DOCUMENTS

| | | |
|---|---|---|
| JP | 04-350822 | 12/1992 |
| JP | 5-249471 | 9/1993 |
| JP | 08-114804 | 5/1996 |
| JP | 11-095221 | 4/1999 |
| JP | 11-109388 | 4/1999 |
| JP | 2001-083529 | 3/2001 |
| JP | 2004-133096 | 4/2004 |
| JP | 2004-294605 | 10/2004 |
| JP | 2004-294648 | 10/2004 |

* cited by examiner

*Primary Examiner* — Lucy Chien
(74) *Attorney, Agent, or Firm* — Greer, Burns & Crain, Ltd.

(57) ABSTRACT

The invention relates to a vertical alignment type liquid crystal display and a method of manufacturing the same and provides a liquid crystal display and a method of manufacturing the same which allow a reduction of manufacturing cost. A configuration is employed, which includes a pair of substrates provided opposite to each other, a liquid crystal sealed between the substrates, and a photo-curing material for controlling the alignment of the liquid crystal, the photo-curing material being formed in the vicinity of an interface between the liquid crystal and the pair of substrates as a result of polymerization of a polymerizable component mixed in the liquid crystal, the reaction being promoted by a photo-initiator including no chlorine atom.

13 Claims, 9 Drawing Sheets

MONOMER a

FIG.4A

OPTICAL INITIATOR A

FIG.4B

OPTICAL INITIATOR B

FIG.4C

OPTICAL INITIATOR C

FIG.5A

OPTICAL INITIATOR D

FIG.5B

OPTICAL INITIATOR E

OPTICAL INITIATOR F

FIG.7B

OPTICAL INITIATOR G

FIG.7C

OPTICAL INITIATOR H

FIG.7D

OPTICAL INITIATOR I

DIRECTIONS OF DOMAINS

LIQUID CRYSTAL DISPLAY AND METHOD OF MANUFACTURING THE SAME

BACKGROUND OF THE INVENTION

1. Field of the Invention

The present invention relates to a liquid crystal display and a method of manufacturing the same and, more particularly, to a vertical alignment type liquid crystal display in which liquid crystal molecules are aligned substantially perpendicularly to substrate surfaces when no voltage is applied and a method of manufacturing the same.

2. Description of the Related Art

Active matrix liquid crystal displays (LCDs) prevailing in the related art are TN (Twisted Nematic) mode liquid crystal displays in which a liquid crystal material having positive dielectric constant anisotropy is aligned in parallel with surfaces of substrates and is twisted 90° between the substrates that are provided opposite to each other. However, TN mode liquid crystal displays have the problem of low viewing angle characteristics, and various studies are therefore being made to improve the viewing angle characteristics of TN mode liquid crystal displays.

As an alternative to the TN mode, MVA (Multi-domain Vertical Alignment) type liquid crystal displays have been developed, in which a liquid crystal material having negative dielectric constant anisotropy is vertically aligned and in which the tilting direction of liquid crystal molecules at the time of application of a voltage is regulated using protrusions or slits provided on a surface of a substrate. A significant improvement of viewing angle characteristics is successfully achieved in MVA type liquid crystal displays.

Figure 9A:
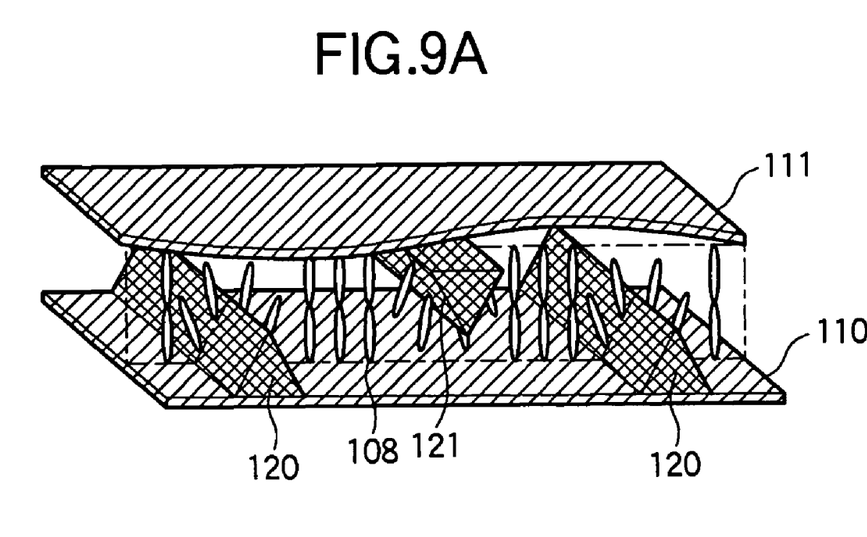
FIGS. 9A and 9B are conceptual illustrations showing a section of an MVA type liquid crystal display as viewed in an oblique direction.
Figure 9B:
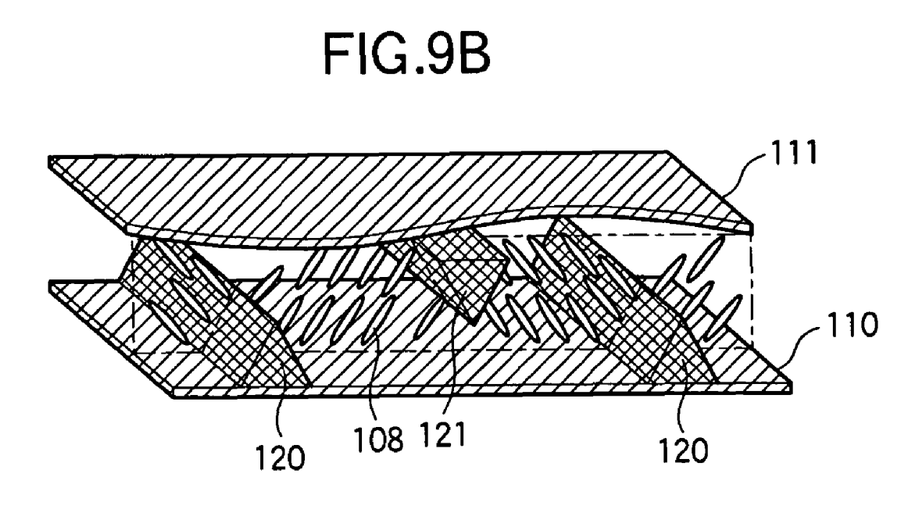
Figure 10:
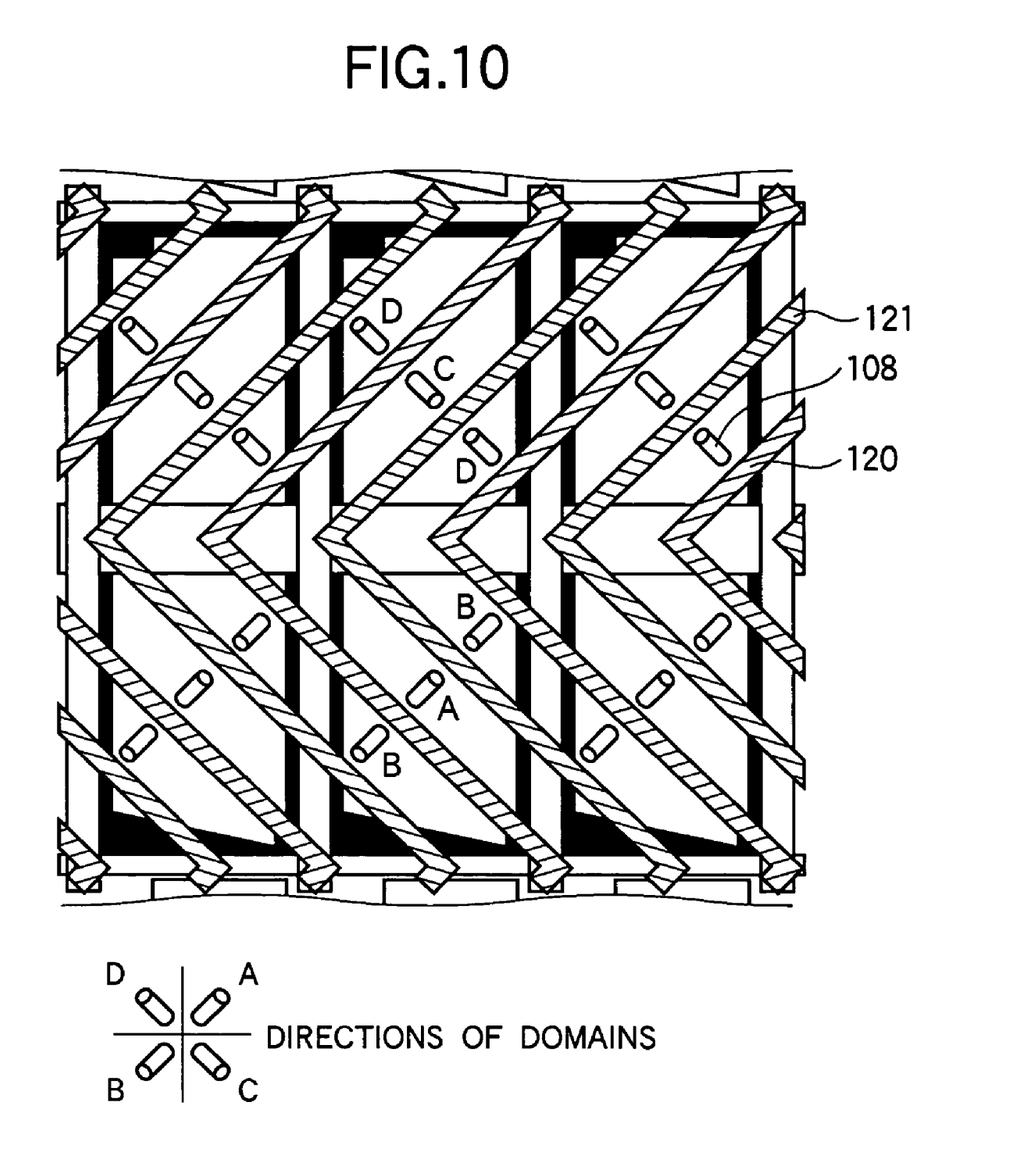
FIG. 10 is a conceptual illustration showing a configuration of three pixels of the MVA type liquid crystal display and aligning directions of liquid crystal molecules therein.

A general MVA type liquid crystal display will now be described with reference to FIGS. 9A to 10. FIGS. 9A and 9B are conceptual illustrations of the MVA type liquid crystal display showing a section of the display taken in an oblique direction. FIG. 10 is a conceptual illustration showing a configuration of three pixels of the MVA type liquid crystal display and aligning directions of liquid crystal molecules therein. In the MVA type liquid crystal display, as shown in FIGS. 9A and 9B, liquid crystal molecules 108 of a liquid crystal material having negative dielectric constant anisotropy are aligned between two glass substrates 110 and 111 substantially perpendicularly to surfaces of the substrates. Although not shown, a pixel electrode connected to a thin film transistor (TFT) is formed at each pixel region on the glass substrate 110, and a common electrode is formed throughout a surface of the glass substrate 111. Protrusions 120 are formed on the pixel electrodes, and protrusions 121 are formed on the common electrode. The protrusions 120 and 121 are disposed such that they are alternately arranged. Vertical alignment films, which are not shown, are formed on the pixel electrodes, common electrodes, and protrusions 120 and 121.

When the TFT is off and no voltage is therefore applied to the liquid crystal molecules 108, the liquid crystal molecules 108 are aligned substantially perpendicularly to a substrate interface as shown in FIG. 9A. When the TFT is turned on, a predetermined voltage is applied to the liquid crystal molecules 108, and the tilting direction of the liquid crystal molecules 108 is regulated by the structure in which the protrusions 120 and 121 are formed. As a result, the liquid crystal molecules 108 are aligned in a plurality of directions as shown in FIG. 9B. For example, when the protrusions 120 and 121 are formed as shown in FIG. 10, the liquid crystal molecules 108 are aligned in four directions A, B, C, and D in one pixel. The MVA type liquid crystal display can achieve high viewing angle characteristics because the liquid crystal molecules 108 in one pixel are aligned in a plurality of directions when the TFT is turned on as thus described.

In the MVA type liquid crystal display, the tilting direction of the liquid crystal molecules 108 is not regulated by the alignment films. Therefore, the MVA method does not necessitate an aligning process such as rubbing that is essential for horizontal aligning methods represented by the TN mode. This is advantageous for processing in that the problem of static electricity and scraps generated by rubbing is eliminated and in that there is no need for a cleaning step after an aligning process. Another advantage accrues from the viewpoint of display quality in that there is no display irregularity attributable to variation of a pre-tilt. As described above, an MVA type liquid crystal display is characterized in that it can be provided at a low cost through simplification of manufacturing processes and an improvement of the yield of manufacture and in that high display quality can be achieved.

However, alignment films must be formed through coating even for MVA type liquid crystal displays for which rubbing is not required. As a result, the yield of manufacture is reduced by irregularities of the film thickness and entrapment of foreign substances that occur at an alignment film printing step, which increases material costs and tact time. As thus described, MVA type liquid crystal displays according to the related art still have the problem of an increase in manufacturing cost attributable to an alignment film printing step.

Recently, there is a trend toward very large mother glasses which accommodate larger liquid crystal displays. However, it is difficult to have alignment film printing apparatus follow up mother glasses which are becoming very large. Further, thin and soft film-like substrates and substrates having a curved shape rather than a planar shape have recently come into use. It is quite difficult to print an alignment film on such substrates. For this reason, a liquid crystal display utilizing a large mother glass or a substrate having a special shape has a problem in that it is difficult to achieve preferable liquid crystal alignment.

Patent Document 1: JP-A-11-95221
Patent Document 2: JP-A-5-249471

SUMMARY OF THE INVENTION

It is an object of the invention to provide a liquid crystal display which can be manufactured at a lower manufacturing cost and a method of manufacturing the display.

It is another object of the invention to provide a liquid crystal display in which preferable liquid crystal alignment can be achieved even when a large mother glass or a substrate having a special shape is used and to provide a method of manufacturing the display.

The above-described objects are achieved by a liquid crystal display, which comprises a pair of substrates provided opposite to each other, a liquid crystal sealed between the pair of substrates, and a photo-curing material for controlling the alignment of the liquid crystal, the photo-curing material being formed in the vicinity of an interface between the liquid crystal and the pair of substrates as a result of polymerization of a polymerizable component mixed in the liquid crystal, the reaction being promoted by a photo-initiator including no chlorine atom.

The invention makes it possible to a liquid crystal display which can be manufactured at a lower cost. The invention also makes it possible to provide a liquid crystal display in which

DESCRIPTION OF THE PREFERRED EMBODIMENT

Figure 1A:
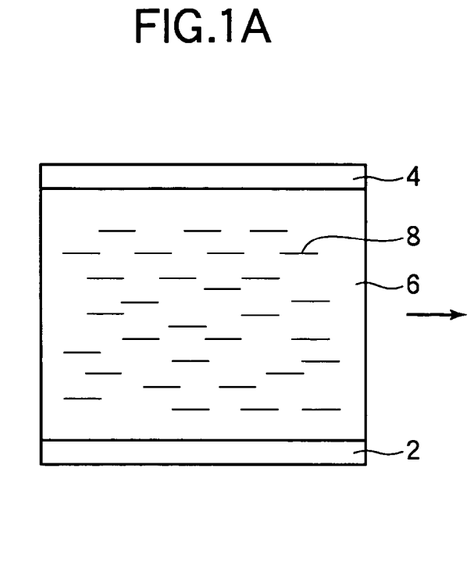
FIGS. 1A and 1B show a schematic configuration of a liquid crystal display and a method of manufacturing the same in a mode for carrying out the invention.
Figure 1B:
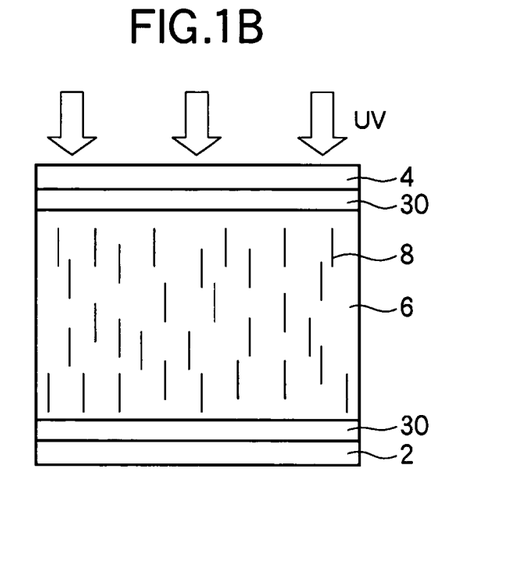

A liquid crystal display and a method of manufacturing the same according to a mode for carrying out the invention will now be described with reference to FIGS. 1A to 8D. FIGS. 1A and 1B show a schematic configuration of the liquid crystal display in the present mode for carrying out the invention and a method of manufacturing the same. First, as shown in FIG. 1A, a liquid crystal 6 having a polymerizable component and an optical initiator including no chlorine atom mixed therein and having negative dielectric constant anisotropy is sealed between a pair of substrates 2 and 4. In the present mode for carrying out the invention, no vertical alignment film is applied to or formed on the substrates 2 and 4, and liquid crystal molecules 8 are therefore aligned substantially in parallel with surfaces of the substrates at this stage. Next, as shown in FIG. 1B, the liquid crystal 6 is irradiated with ultraviolet light (or visible light), the optical initiator consequently promotes a reaction of the polymerizable component to polymerize the same. As a result, an ultraviolet-curing material (optically curing material) 30 is formed at interfaces between the liquid crystal and the substrates 2 and 4. The ultraviolet-curing material 30 has a function of regulating the alignment of the liquid crystal 6, and liquid crystal molecule 8 are aligned substantially perpendicularly to the surfaces of the substrates.

Japanese patent applications (JP-A-2003-85220 and JP-A-2003-420578) made by the applicant have proposed structures of an ultraviolet-curing material for achieving preferable liquid crystal alignment without applying or forming alignment films and methods for forming the material. Those patent applications have disclosed a liquid crystal display which can be provided with initial characteristics at the same level as those of a liquid crystal display having alignment films applied or formed thereon. However, close studies have revealed that conditions for forming an ultraviolet-curing material must be further improved to optimize them in order to achieve both of preferable vertical alignment and long-term reliability of a liquid crystal.

There are upper limits for the intensity and dose of ultraviolet light to irradiate a liquid crystal when attention is paid to the fact that a reduction of a voltage holding rate can be caused by deterioration of the liquid crystal. Therefore, when a liquid crystal is not doped with an optical initiator, the rate of a monomer in the liquid crystal remaining after irradiation with ultraviolet light is, in general, as considerably high as 40% or more. Even when a monomer remains at such a high survival rate, initial characteristics (a voltage holding rate, a residual DC value, and so on) can be achieved at the same level as those of a liquid crystal display according to the related art having alignment films applied or formed thereon. However, there are problems such as significant degradation of characteristics after a long-term shelf test and fluctuation of a common voltage that is observed as time passes when the technique is applied to an MVA type liquid crystal display. Therefore, it is not correct to say that the technique truly makes it possible to achieve characteristics which are on the same level as those of a liquid crystal display according to the related art having alignment films applied or formed thereon.

In order to cause a reaction of a monomer in a greatest possible amount in a liquid crystal without degrading the liquid crystal, it is necessary to add an optical initiator which generates radicals under light having a wavelength of 310 nm or more. It has been found that the survival rate of a monomer can be reduced to about 10% when the liquid crystal is doped with such an optical initiator. However, when an optical initiator which releases an impurity in the liquid crystal is added, the voltage holding rate decreases, although response is improved. It has become clear for the above-described reason that an optical initiator having chlorine atoms serving as radicals cannot be used, although the optical initiator exhibits quite high response.

Further trials have revealed that a reduction of the voltage holding rate of a liquid crystal frequently occurs even when it is doped with an optical initiator having molecules serving as radicals and having a somewhat great molecular weight which is not as small as that of chlorine atoms. It has been also found that it is important to use an optical initiator which generates radicals all having a ring structure when cleaved in order to obtain a preferable voltage holding rate. It has been also found that it is preferable to use an optical initiator which generates radicals without being cleaved, i.e., an optical initiator of the intermolecular hydrogen abstraction type because cleavage can cause a reduction in reliability. It is possible to improve the initial voltage holding rate of a liquid crystal and to significantly improve the long-term reliability of the same by forming an ultraviolet-curing material using such optical initiators.

It has been also found that the symmetry of the structure of a monomer (multi-functional monomer) is quite important in order to achieve reliability of electrical characteristics (such as the magnitudes of the initial voltage holding rate and residual DC value and the degree of degradation of those characteristics after a long-term shelf test) at the same level as achieved with alignment films according to the related art. It was revealed that high characteristics can be achieved when the finding is reflected in an optical initiator. Specifically, when a liquid crystal is doped with an optical initiator having a xanthone structure and a symmetric structure to form an ultraviolet-curing material, it is possible to obtain a liquid crystal display which has a voltage holding rate better than that of a liquid crystal display having alignment films applied or formed thereon and which has quite high reliability in long term. When it is stated that a molecular (atomic) arrangement has a symmetric structure, what is meant is that the arrangement is symmetric, i.e., line symmetric or point symmetric. For example, Chemical Formula 1 shown below comprising atoms or molecules A, B, and C is one of structures having "a symmetric structure".

Chemical Formula 1

In an MVA type liquid crystal display having an ultraviolet-curing material formed using such an optical initiator, display sticking is less likely to occur when compared to an MVA type liquid crystal display having alignment films applied or formed thereon.

Attention must be paid to the range of the wavelengths of light which is radiated to form the ultraviolet-curing material 30. Even if the ultraviolet-curing material 30 can be formed with high electrical stability, a display having high reliability cannot be obtained if the liquid crystal 6 itself is deteriorated when the material is formed. It has been found that, in order to prevent the deterioration of the liquid crystal 6, it is preferable to irradiate the liquid crystal with ultraviolet light from which the range of short wavelengths less than 310 nm has been cut off using a filter. It is desirable that the intensity of the ultraviolet light at the wavelength of 310 nm is 0.1 mW/cm$^2$ or less. However, it is difficult to achieve desired liquid crystal alignment using ultraviolet light whose intensity is zero at the wavelength of 310 nm. It is therefore desirable to irradiate the liquid crystal with ultraviolet light whose intensity is approximately in the range from 0.02 to 0.05 mW/cm$^2$ at the wavelength of 310 nm. Therefore, an optical initiator must also have a structure from which radicals can be generated under the above-described conditions.

Even when an ultraviolet-curing material is formed on substrate interfaces using an optical initiator as described above, it is not necessarily possible to obtain a liquid crystal display which is highly reliable under any condition. The reason is that the electrical characteristics and long-term reliability of the liquid crystal after the formation of the ultraviolet-curing material is highly dependent on the amount of the part of the monomer which has reacted. Specifically, the total amount of the unreacted part of the monomer included in the liquid crystal after the formation of the ultraviolet-curing material is desirably 1.0% or less of the liquid crystal in terms of weight percentage. It is further desirable that the process of forming the ultraviolet-curing material is stopped when a sign of saturation is observed in the amount of the monomer which has reacted. The reason is that when the irradiation with ultraviolet light is continued beyond a predetermined time, the energy of irradiation contributes to accumulation of damage to the liquid crystal to degrade the characteristics thereof rather than contributing to the polymerizing reaction of the monomer.

The advantage of the present mode for carrying out the invention is maximized when it is combined with the one drop filling (ODF) method. When a liquid crystal mixed with a monomer is injected in a large panel using dip type vacuum injection as seen in the related art, alignment abnormality attributable to the distribution of the monomer can occur at an end of the panel that is opposite to a liquid crystal filling port, and the abnormality is visually perceived as a display irregularity.

Figure 2:
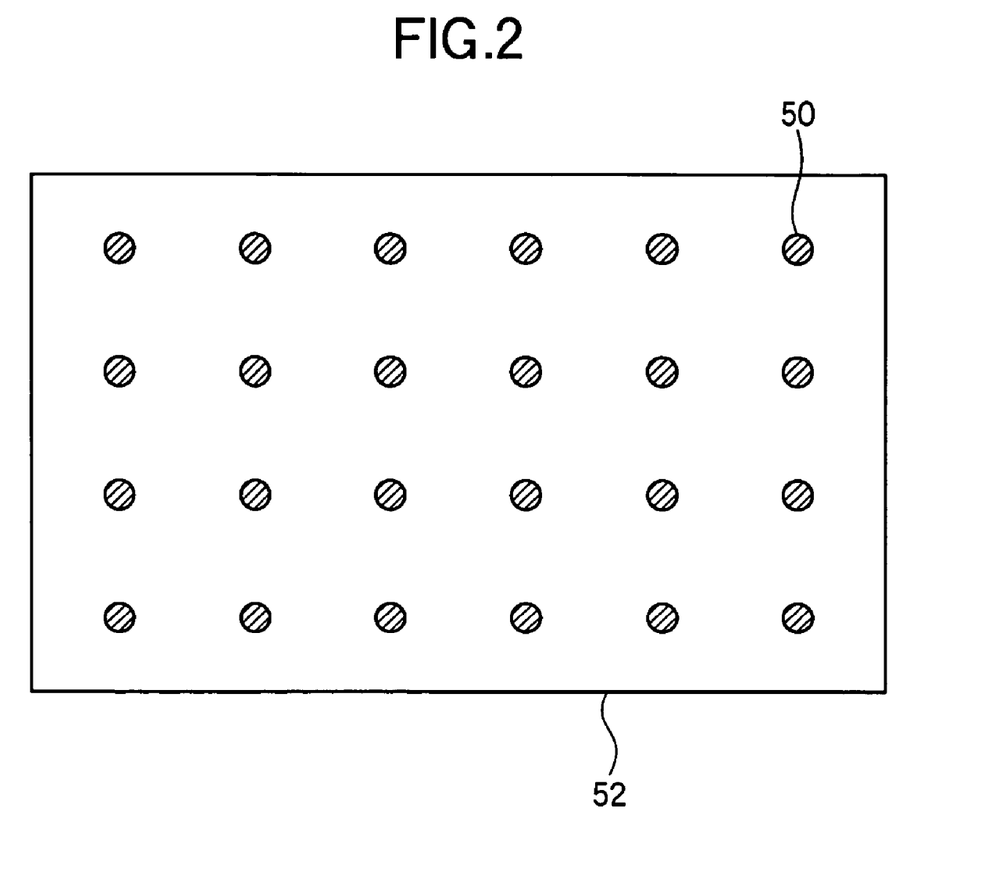
FIG. 2 shows traces of dispensing on a liquid crystal display panel according to the related art fabricated using the one drop filling method.

In a liquid crystal display panel fabricated by dispensing a liquid crystal on a substrate having an alignment film formed thereon using the one drop filling method, a problem arises in that display irregularities (traces of dispensing) 50 as shown in FIG. 2 may be observable in locations inside a display area 52 where the liquid crystal has been dispensed. In the present mode for carrying out the invention, since no alignment film is formed on substrates, traces of dispensing 50 are very hardly observed even when the one drop filling method is used.

Panel fabrication steps according to the related art have necessitated the construction of a production line having three kinds of apparatus provided thereon, i.e., an alignment film printing apparatus, a substrate combining apparatus, and a liquid crystal filling apparatus. When the present mode for carrying out the invention is combined with the one drop filling method, the three apparatus can be replaced with a single dispensing apparatus. It is therefore possible to manufacture highly reliable liquid crystal displays at a low cost using a simple production line.

According to the one drop filling method, in general, an ultraviolet-curing seal material is continuously applied to a peripheral part of one of substrates, and the seal material is cured by irradiating it with ultraviolet light after combining the substrate with another substrate. According to the one drop filling method, since the liquid crystal is injected at the same time when the substrates are combined, the liquid crystal is also irradiated with ultra violet light in the vicinity of the seal material. As a result, the polymerizing reaction of a monomer in the liquid crystal locally proceeds. In order to prevent the localized progress of the polymerizing reaction, it is desirable to use a seal material which can be cured with visible light and to cure the seal material with visible light. Thus, since the liquid crystal in the vicinity of the seal material is irradiated with visible light, polymerization of a monomer will not start in that region. Even when dip type vacuum injection is employed, it is desirable to seal the liquid crystal using a sealing material which can be cured with visible light for the same reason as described above.

In the present mode for carrying out the invention, since there is no need for printing alignment films, preferable liquid crystal alignment can be easily achieved even in a liquid crystal display fabricated using large mother glasses, thin and flexible film-like substrates, substrates having a curved shape rather than a planar shape, or the like.

The liquid crystal display and the method of manufacturing the same in the present mode for carrying out the invention will now be more specifically described with reference preferred embodiments of the same.

Embodiment 1

Figure 3:
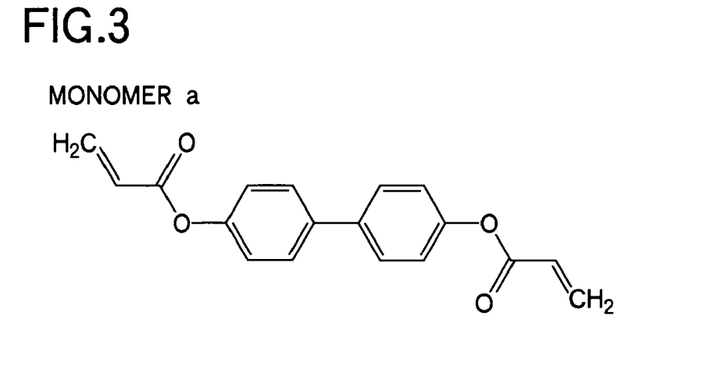
FIG. 3 shows a bi-functional monomer used in liquid crystal displays according to Embodiment 1 in the mode for carrying out the invention.
Figure 4A:
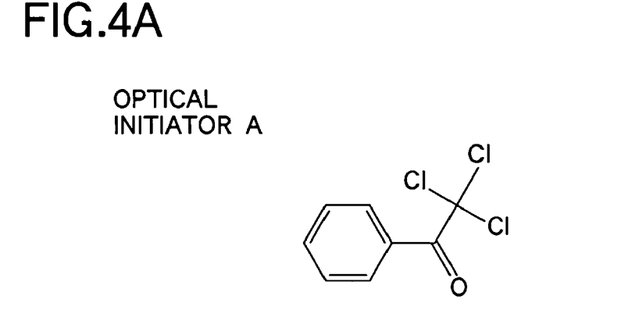
FIGS. 4A, 4B, and 4C show optical initiators used in the liquid crystal displays according to Embodiment 1 in the mode for carrying out the invention.
Figure 4B:
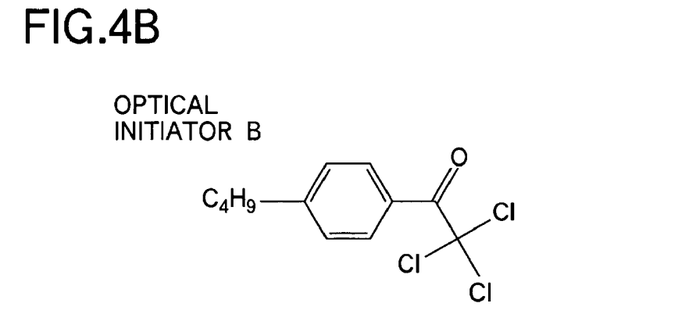
Figure 4C:
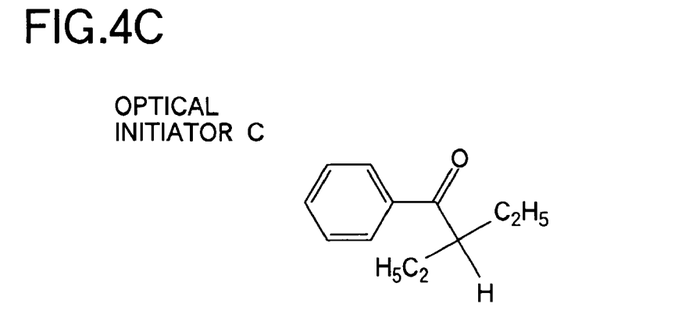

Lauryl acrylate was dissolved in a negative liquid crystal A manufactured by Merck Co. to a molality of $1.3 \times 10^{-4}$ mol/g. A bi-functional monomer a as shown in FIG. 3 was dissolved in the liquid crystal having lauryl acrylate dissolved therein to a molality of $1.3 \times 10^{-5}$ mol/g that was one-tenths the above-described molality to provide a mixed liquid crystal. Then, the mixed liquid crystal was divided into four portions. No optical initiator was added to one of the portions, and three types of optical initiators A, B, and C as shown in FIGS. 4A, 4B, and 4C were added to the remaining three portions respectively such that the initiators would be 2.0 mol % of the monomer. Any of the optical initiators A, B, and C has an acetophenone structure. The optical initiators A and B include chlorine atoms, and the optical initiator C includes no chlorine atom.

Four vacant cells were fabricated by combining a pair of glass substrates each having an electrode constituted by an ITO formed thereon so as to provide a cell thickness of 4.25 μm. No alignment film was applied or formed on neither of the glass substrates. Next, the four types of mixed liquid crystals were injected and sealed in the vacant cells to fabricate four types of cells to be evaluated. The mixed liquid crystal in each of the cells to be evaluated was irradiated with unpolarized ultraviolet light. The ultraviolet light has an irradiation intensity of 1 $mW/cm^2$ and an irradiation energy of 9000 $mJ/cm^2$.

The state of alignment of the liquid crystal was observed and the voltage holding rate was measured on the four types of cells to be evaluated. Table 1 shows the result.

TABLE 1

| Optical Initiator | Vertical Alignment | Initial Voltage Retention Rate (%) (Retention Period: 16.7 ms) | Monomer Survival Rate (%) | Retention Reduction Rate (%) (70° C., 1000 hours) |
|---|---|---|---|---|
| None | Yes | 96.9 | 75 | 7.8 |
| A | Yes | 2.2 | 29 | — |
| B | Yes | 7.8 | 32 | — |
| C | Yes | 95.4 | 27 | 4.2 |

While the liquid crystals in all of the cells for evaluation had been in horizontal alignment that is random in the azimuth direction before they were irradiated with ultraviolet light, vertical alignment was achieved in all of the cells for evaluation as shown in Table 1 after the irradiation with ultraviolet light. The monomer survival rate (the amount of the monomer after the irradiation with ultraviolet light/the amount of the monomer before the irradiation with ultraviolet light) was measured for each of the cells for evaluation using gas chromatography. The monomer survival rates of the three types of evaluation cells added with an optical initiator had been reduced to about 30% which is equal to or less than the half of the monomer survival rate of the evaluation cell added with no optical initiator. The total amounts of the monomer in the evaluation cells added with an optical initiator were 1.0% or less of the liquid crystal in terms of weight percentage. Referring to the initial voltage holding rate, the evaluation cells were categorized into two groups, i.e., cells which were evaluated as good and cells which were evaluated as no good. It was found that the evaluation cells added with the optical initiators A and B including chlorine atoms had a quire low initial voltage holding rate. A comparison between the evaluation cell added with the optical initiator C and the evaluation cell added with no optical initiator revealed that the evaluation cell added with no optical initiator had a higher initial voltage holding rate. However, when the voltage holding rates were compared after leaving the cells alone for 1000 hours at 70° C., the voltage holding rate (91.4% (=0.954×(1−0.042))) of the evaluation cell added with the optical initiator C was higher than the voltage holding rate (89.3% (=0.969×(1−0.078))) of the evaluation cell added with no optical initiator.

Embodiment 2

Figure 5A:
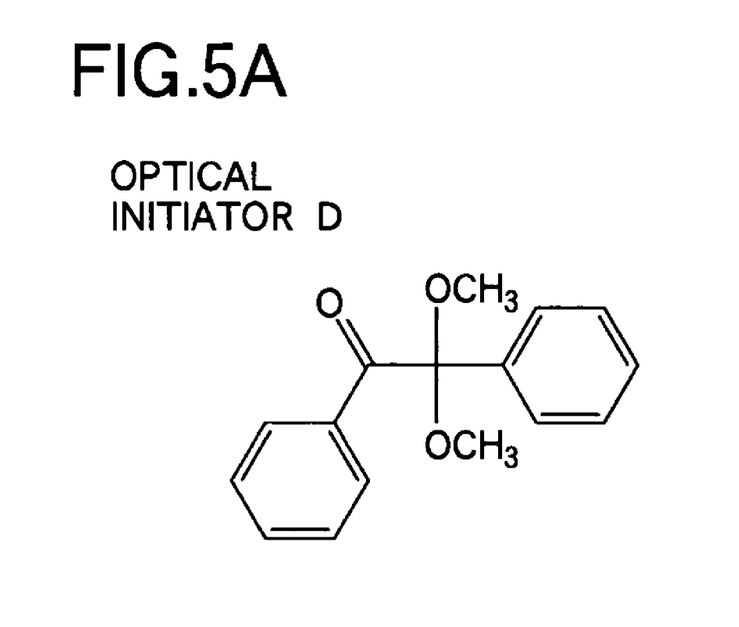
FIGS. 5A and 5B show optical initiators used in liquid crystal displays according to Embodiment 2 in the mode for carrying out the invention.
Figure 5B:
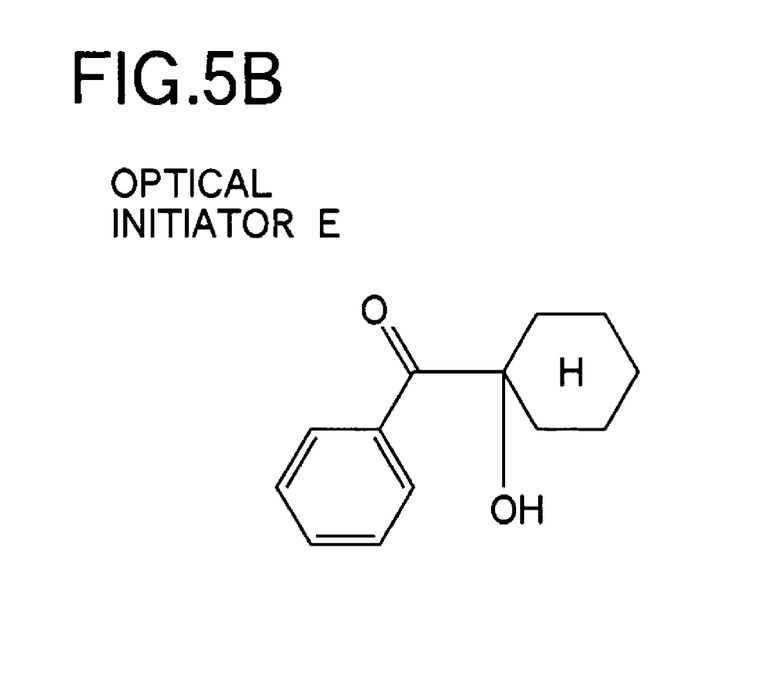

Lauryl acrylate was dissolved in the negative liquid crystal A manufactured by Merck Co. to a molality of $1.3 \times 10^{-4}$ mol/g. A bi-functional monomer a as shown in FIG. 3 was dissolved in the liquid crystal having lauryl acrylate dissolved therein to a molality of $1.3 \times 10^{-5}$ mol/g that was one-tenths the above-described molality to provide a mixed liquid crystal. Then, the mixed liquid crystal was divided into three portions. No optical initiator was added to one of the portions, and two types of optical initiators D and E as shown in FIGS. 5A and 5B were added to the remaining two portions respectively such that the initiators would be 2.0 mol % of the monomer. Both of the optical initiators D and E have two ring structures and generates radicals all having a ring structure when cleaved by light.

Three vacant cells were fabricated by combining a pair of glass substrates each having an electrode constituted by an ITO formed thereon so as to provide a cell thickness of 4.25 μm. No alignment film was applied or formed on neither of the glass substrates. Next, the three types of mixed liquid crystals were injected and sealed in the vacant cells to fabricate three types of cells to be evaluated. The mixed liquid crystal in each of the cells to be evaluated was irradiated with unpolarized ultraviolet light. The ultraviolet light has an irradiation intensity of 1 $mW/cm^2$ and an irradiation energy of 9000 $mJ/cm^2$.

The state of alignment of the liquid crystal was observed and the voltage holding rate was measured on the three types of cells to be evaluated. Table 2 shows the result.

TABLE 2

| Optical Initiator | Vertical Alignment | Initial Voltage Retention Rate (%) (Retention Period: 16.7 ms) | Monomer Survival Rate (%) | Retention Reduction Rate (%) (70° C., 1000 hours) |
|---|---|---|---|---|
| None | Yes | 96.9 | 75 | 7.8 |
| D | Yes | 97.2 | 28 | 3.9 |
| E | Yes | 98.1 | 27 | 3.4 |

Just as in Embodiment 1, the liquid crystals in all of the cells for evaluation had been in horizontal alignment that is random in the azimuth direction before they were irradiated with ultraviolet light. Vertical alignment was achieved in all of the cells for evaluation as shown in Table 2 after the irradiation with ultraviolet light. The monomer survival rate was measured for each of the cells for evaluation using gas chromatography. The monomer survival rates of both of the two types of evaluation cells added with an optical initiator had been reduced below 30%. The total amounts of the monomer in the evaluation cells added with an optical initiator were 1.0% or less of the liquid crystal in terms of weight percentage. A comparison of the initial voltage holding rates revealed that the voltage holding rates of the evaluation cells added with an optical initiator were higher than the voltage holding rate of the evaluation cell added with no optical initiator. A comparison of the voltage holding rates after leaving the cells alone for 1000 hours at 70° C. also revealed that the voltage holding rate (93.4% (=0.972×(1−0.039))) of the evaluation cell added with the optical initiator D and the voltage holding rate (94.8% (=0.981×(1−0.034))) of the evaluation cell added with the optical initiator E were higher than the voltage holding rate (89.3%) of the evaluation cell added with no optical initiator. A comparison between the optical initiators D and E revealed that the evaluation cell added with the optical initiator E had provided better results.

Embodiment 3

Figure 6:
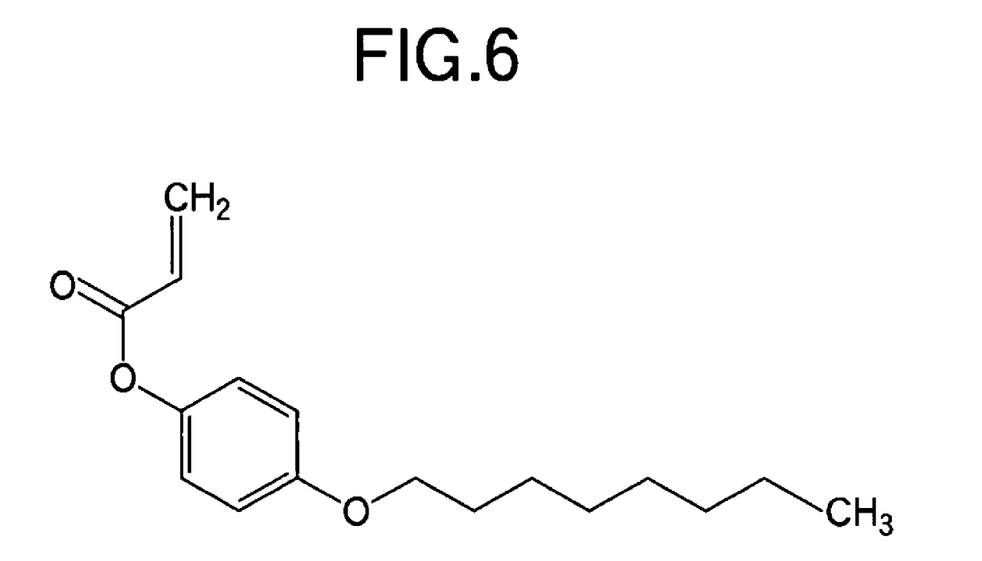
FIG. 6 shows a mono-functional monomer used in liquid crystal displays according to Embodiment 3 in the mode for carrying out the invention.
Figure 7A:
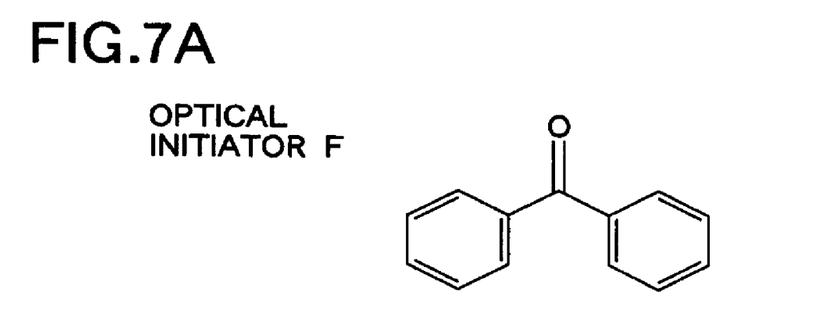
FIGS. 7A, 7B, 7C, and 7D show optical initiators used in the liquid crystal displays according to Embodiment 3 in the mode for carrying out the invention.
Figure 7B:
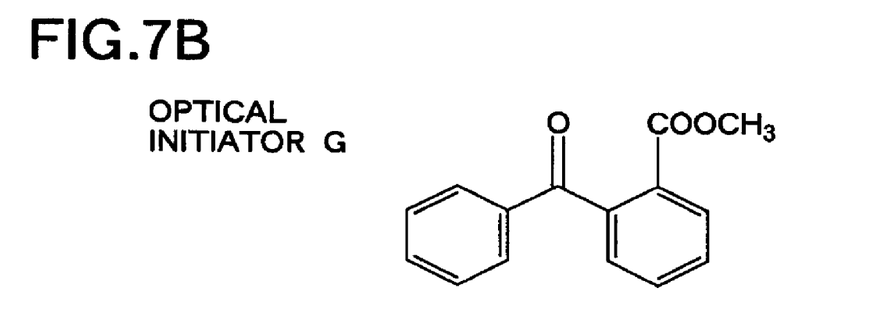
Figure 7C:
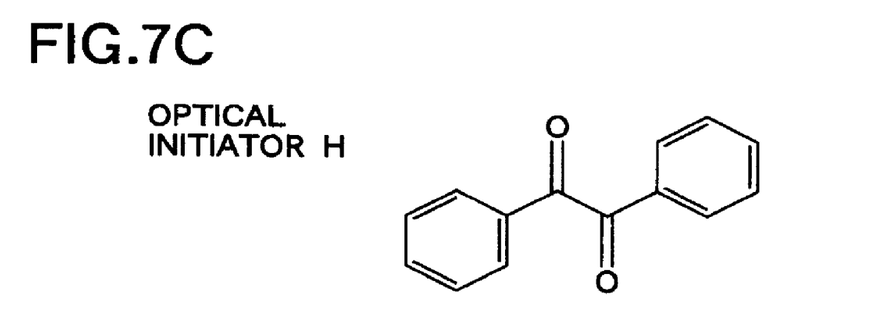
Figure 7D:
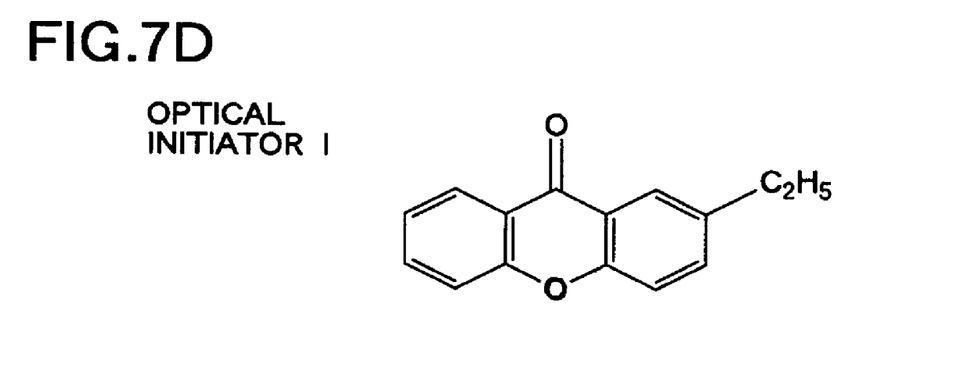

A mono-functional monomer as shown in FIG. 6 was dissolved in the negative liquid crystal A manufactured by Merck Co. to a molality of $1.3\times10^{-4}$ mol/g. A bi-functional monomer a as shown in FIG. 3 was dissolved in the liquid crystal having mono-functional monomer dissolved therein to a molality of $1.3\times10^{-5}$ mol/g that was one-tenths the above-described molality to provide a mixed liquid crystal. Then, the mixed liquid crystal was divided into five portions. No optical initiator was added to one of the portions, and four types of optical initiators F to I as shown in FIGS. 7A to 7D were added to the remaining four portions respectively such that the initiators would be 2.0 mol % of the monomer. The optical initiators F to I were subjected to hydrogen abstraction instead of cleavage to generate radicals of the intermolecular hydrogen abstraction type. The optical initiator I had a xanthone structure, and the optical initiators F and H had a symmetric structure.

Five vacant cells were fabricated by combining a pair of glass substrates each having an electrode constituted by an ITO formed thereon so as to provide a cell thickness of 4.25 μm. No alignment film was applied or formed on neither of the glass substrates. Next, the five types of mixed liquid crystals were injected and sealed in the vacant cells to fabricate five types of cells to be evaluated. The mixed liquid crystal in each of the cells to be evaluated was irradiated with unpolarized ultraviolet light. The ultraviolet light has an irradiation intensity of 1 mW/cm$^2$ and an irradiation energy of 8000 mJ/cm$^2$.

The state of alignment of the liquid crystal was observed and the voltage holding rate was measured on the five types of cells to be evaluated. Table 3 shows the result.

TABLE 3

| Optical Initiator | Vertical Alignment | Initial Voltage Retention Rate (%) (Retention Period: 16.7 ms) | Monomer Survival Rate (%) |
| --- | --- | --- | --- |
| None | Yes | 88.3 | 78 |
| F | Yes | 98.5 | <20 |
| G | Yes | 97.4 | <20 |
| H | Yes | 98.4 | 22 |
| I | Yes | 97.2 | <20 |

Just as in Embodiments 1 and 2, the liquid crystals in all of the cells for evaluation had been in horizontal alignment that is random in the azimuth direction before they were irradiated with ultraviolet light. Vertical alignment was achieved in all of the cells for evaluation as shown in Table 3 after the irradiation with ultraviolet light. The monomer survival rate was measured for each of the cells for evaluation using gas chromatography. The monomer survival rates of the four types of evaluation cells added with an optical initiator had been reduced to about 20%. A comparison of the initial voltage holding rates revealed that the voltage holding rates of the evaluation cells added with an optical initiator were significantly higher than the voltage holding rate of the evaluation cell added no optical initiator. A comparison between the optical initiators F to I revealed that the evaluation cells added with the optical initiators F and H had provided better results.

Embodiment 4

Four vacant cells were fabricated with a configuration which was similar to that shown in FIGS. 9A to 10 except that slits were formed instead of the protrusions 121 on the glass substrate 111. The protrusions 120 were formed from a photo-resist. The protrusions 120 had a width of 10 μm and a height of 1.5 μm. A polyimide material X manufactured by JSR Corporation was applied to surfaces of the glass substrates 110 and 111 opposite to each other to form alignment films in one of the vacant cells. No alignment film was formed in the remaining three vacant cells. All of the vacant cells had a cell thickness of 4.25 μm.

A mono-functional monomer as shown in FIG. 6 was dissolved in the negative liquid crystal A manufactured by Merck Co. to a molality of $1.3\times10^{-4}$ mol/g. A bi-functional monomer a as shown in FIG. 3 was dissolved in the liquid crystal having the mono-functional monomer dissolved therein to a molality of $1.3\times10^{-5}$ mol/g that was one-tenths the above-described molality to provide a mixed liquid crystal. Then, the mixed liquid crystal was divided into three portions. No optical initiator was added to one of the portions, and the optical initiator E shown in FIG. 5B and the optical initiator F shown in FIG. 7A were added to the remaining two portions respectively such that the initiators would be 2.0 mol % of the monomer. The vacant cell having alignment films formed thereon was filled with the negative liquid crystal A which was added with neither monomer nor optical initiator, and the three vacant cells having no alignment film formed thereon were filled with the three types of mixed liquid crystals, respectively. Thus, four types of MVA cells for evaluation were fabricated. Next, the mixed liquid crystals in the three types of evaluation cells added with a monomer were irradiated with unpolarized ultraviolet light from the side of the glass substrate 111 having slits formed thereon. The ultraviolet light has an irradiation intensity of 1 mW/cm$^2$ and an irradiation energy of 8000 mJ/cm$^2$.

Figure 8A:
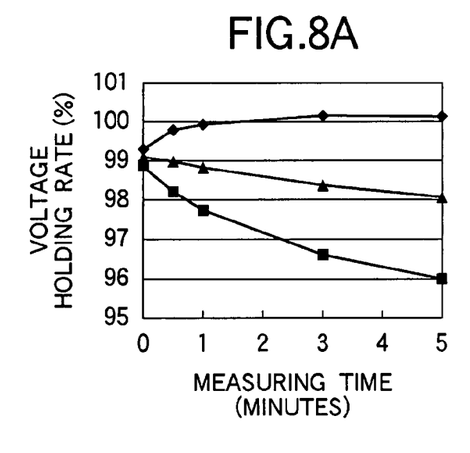
FIGS. 8A, 8B, 8C, and 8D are graphs showing time-dependent changes in voltage holding rates of the liquid crystal displays according to Embodiment 3 in the mode for carrying out the invention.
Figure 8B:
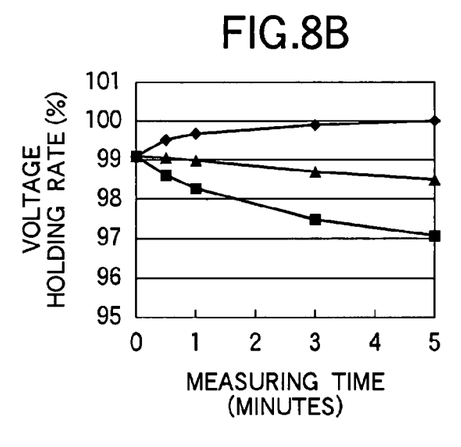
Figure 8C:
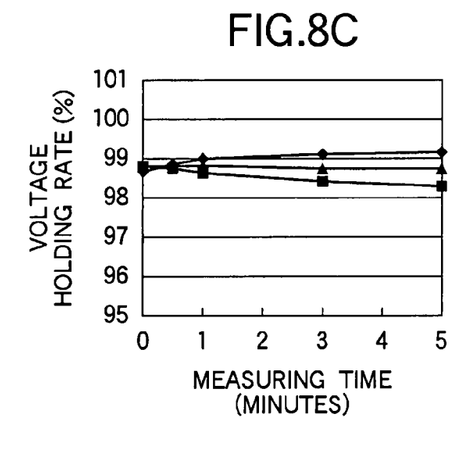
Figure 8D:
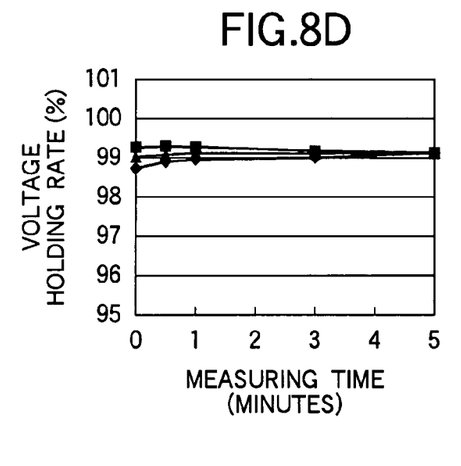

A comparison was made between time-dependent changes in the voltage holding rates (retention period: 16.67 ms) of the four types of evaluation cells. FIG. 8A is a graph showing time-dependent changes in the voltage holding rate of the evaluation cell having alignment films formed thereon (standard MVA cell), and FIG. 8B is a graph showing time-dependent changes in the voltage holding rate of the evaluation cell added with no optical initiator. FIG. 8C is a graph showing time-dependent changes in the voltage holding rate of the evaluation cell added with the optical initiator E, and FIG. 8D is a graph showing time-dependent changes in the voltage holding rate of the evaluation cell added with the optical initiator F. The abscissa axes of FIGS. 8A to 8D represent measuring times (minutes), and the ordinate axes represent voltage holding rates (%). The lines connectingsolid diamond-likesymbols indicate changes in the voltage holding rates when the glass substrate 111 having slits formed thereon was at a positive (upper) potential, and the lines connecting solid square symbols indicate changes in the voltage holding rates when the glass substrate 111 having slits formed thereon was at a negative (lower) potential. The lines connecting solid triangles indicate averages of voltage holding rates in both states of the potential.

As shown in FIG. 8A, the voltage holding rate of the standard MVA cell became more dependent on the polarity as time passed, and the average value of the rate gradually decreased. As shown in FIG. 8B, the evaluation cell added with no optical initiator provided results substantially similar to those of the standard MVA cell, although the cell had slightly smaller polarity-dependent differences in the voltage holding rate and a smaller reduction in the average value when compared to the standard MVA cell. On the contrary, it was observed that the evaluation cell added with the optical initiator E had substantially no change in the average value of the voltage holding rate and considerably small polarity dependence, as apparent from FIG. 8C. Further, as shown in FIG. 8D, the evaluation cell added with the optical initiator F had excellent characteristics in that it had average values of the voltage holding rate higher than those of the standard MVA cell and substantially no polarity dependence.

Embodiment 5

An MVA type 17-inch wide (1280×768 dots) TFT liquid crystal display panel was fabricated by printing alignment films on two substrates and injecting the negative liquid crystal A manufactured by Merck Co. using the one drop filling method. When halftone display was conducted, traces of dispensing 50 as shown in FIG. 2 were observed in positions where the liquid crystal was dispensed.

Next, an MVA type 17-inch wide TFT liquid crystal display panel was similarly fabricated by injecting a mixed liquid crystal that is obtained by dissolving a mono-functional monomer and a bi-functional monomer in the negative liquid crystal A and adding the optical initiator F using the one drop filling method without printing alignment films. The type and density of the monomer and the dose of the optical initiator F were the same as those in Embodiment 4. The liquid crystal was horizontally aligned throughout the panel in the initial state. In positions where the liquid crystal was dispensed, traces of dispensing were observed when no voltage was applied. The liquid crystal display panel was then irradiated with unpolarized ultraviolet light having an irradiation intensity of 1 mW/cm$^2$ and an irradiation energy of 9000 mJ/cm$^2$. With such a procedure, the liquid crystal had vertical alignment the entire surface. When halftone display was conducted, no trace of dispensing was observed in all gradation, and thus extremely satisfactory liquid crystal orientation could be obtained.

As described above, in the present mode for carrying out the invention, no alignment film forming step is required for liquid crystal displays, in particular, liquid crystal displays of vertical alignment types represented by the MVA type, and it is therefore possible to reduce the manufacturing cost of such displays significantly. It is also possible to provide a liquid crystal display having high long-term reliability. Further, even when a very large mother glass board which cannot be properly handled by an alignment film printing apparatus according to a prior method is used, an ultraviolet-curing material for controlling the alignment of a liquid crystal can be easily formed without undergoing any influence of the size of the board. Similarly, an ultraviolet-curing material for controlling the alignment of a liquid crystal can be easily formed even when using a substrate, on which it is difficult to form an alignment film, such as a substrate having great irregularities or a substrate having a curved surface rather than a planar surface. Therefore, the present mode for carrying out the invention makes it possible to provide a liquid crystal display in which preferable liquid crystal alignment can be achieved even when a large mother glass or a substrate having a special shape is used.

The invention is not limited to the above-described mode for carrying out the same and may be modified in various ways.

For example, although transmissive liquid crystal displays have been described by way of example in the above mode for carrying out the invention, the invention is not limited to them and may be applied to other types of liquid crystal displays such as reflective and transflective displays.

For example, although active matrix liquid crystal displays have been described by way of example in the above mode for carrying out the invention, the invention is not limited to them and may be applied to simple matrix liquid crystal displays.

What is claimed is:

1. A liquid crystal display, comprising:
   a pair of substrates provided opposite to each other;
   a liquid crystal including a polymerizable compound and a photo-initiator including no chlorine atom sealed between the pair of substrates; and
   a photo-curing material for controlling the alignment of the liquid crystal, the photo-curing material being formed in direct contact with the entirety of each interface between the liquid crystal and the pair of substrates so as to sandwich the liquid crystal between two layers of the photo-curing material as a result of polymerization of the polymerizable component mixed in the liquid crystal, the reaction being promoted by the photo-initiator including no chlorine atom.

2. A liquid crystal display according to claim 1, wherein the photo-initiator is cleaved by light to generate radicals which all have a ring structure.

3. A liquid crystal display according to claim 1, wherein the photo-initiator is made to generate radicals of intermolecular hydrogen abstraction type when irradiated by light.

4. A liquid crystal display according to claim 3, wherein the photo-initiator has a xanthone structure.

5. A liquid crystal display according to claim 4, wherein the photo-initiator has a symmetrical structure.

6. A liquid crystal display according to claim 1, wherein the total amount of the unreacted polymerizable component remaining in the liquid crystal is 1.0% or less of the liquid crystal in terms of weight percentage.

7. A liquid crystal display according to claim 1, wherein an alignment film for controlling the alignment of the liquid crystal is not formed in the vicinity of an interface between the pair of substrates and the liquid crystal.

8. A liquid crystal display according to claim 1, wherein the liquid crystal is sealed using a one drop filling method.

9. A liquid crystal display according to claim 8, wherein the pair of substrates is combined with each other using a seal material which can be cured by visible light.

10. A liquid crystal display according to claim 1, wherein the liquid crystal is sealed using a sealing material which can be cured by visible light.

11. A liquid crystal display according to claim 1, wherein the liquid crystal has negative dielectric constant anisotropy and is aligned substantially perpendicularly to a surface of the substrates when no voltage is applied and wherein an alignment regulating structure for regulating the direction of alignment of the liquid crystal when a voltage is applied is formed on at least either of the pair of substrates.

12. A method of manufacturing a liquid crystal display, comprising the steps of:
   sealing a liquid crystal having a polymerizable component and an optical initiator including no chlorine atom mixed therein between a pair of substrates;
   irradiating the liquid crystal with light to cause the optical initiator to promote a reaction, thereby polymerizing the polymerizable component; and
   forming a photo-curing material in direct contact with the entirety of each interface between the liquid crystal and the pair of substrates so as to sandwich the liquid crystal between two layers of the photo-curing material.

13. The method according to claim 12, wherein the liquid crystal is sealed using a one drop filling method.

* * * * *